United States Patent
Vijayanarasimhan et al.

(10) Patent No.: US 9,230,159 B1
(45) Date of Patent: Jan. 5, 2016

(54) ACTION RECOGNITION AND DETECTION ON VIDEOS

(71) Applicant: Google Inc., Mountain View, CA (US)

(72) Inventors: Sudheendra Vijayanarasimhan, Mountain View, CA (US); Balakrishnan Varadarajan, Mountain View, CA (US); Rahul Sukthankar, Orlando, FL (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 14/100,595

(22) Filed: Dec. 9, 2013

(51) Int. Cl.
| | | |
|---|---|---|
| *G06K 9/00* | (2006.01) | |
| *G06K 9/62* | (2006.01) | |
| *G10L 15/14* | (2006.01) | |

(52) U.S. Cl.
CPC .................................. *G06K 9/00342* (2013.01)

(58) Field of Classification Search
CPC .......... G06K 9/00335; G06K 9/00342; G06K 9/00369; G06K 9/00315; G06K 9/00288; G06K 9/46; G06K 9/00348; G06K 9/6297; G06K 9/6201; G06K 9/6202; G06K 9/6212; G06K 9/6267; G06K 2009/6213; G06T 2207/20144; G06T 2207/20021; G06T 2207/20081; G06T 2207/30004; G06T 7/20; A61B 5/1113; A61B 5/1116; A61B 5/1118; A61B 5/7268; A61B 5/7267; A61B 2503/40
USPC ......... 382/100, 155, 159, 181, 224, 228, 161, 382/187, 115, 118, 209, 217, 218, 229, 190, 382/107, 168, 173, 276, 232, 254; 704/231, 704/251, 255, 256, 256.1, 256.2, 232, 236, 704/239; 706/12, 45, 46, 52; 348/61, 143, 348/152, 155; 345/418, 473
See application file for complete search history.

(56) References Cited

U.S. PATENT DOCUMENTS

| | | | | |
|---|---|---|---|---|
| 6,678,413 | B1* | 1/2004 | Liang et al. ................... | 382/181 |
| 8,538,081 | B2* | 9/2013 | Ding et al. ..................... | 382/103 |
| 8,635,065 | B2* | 1/2014 | Goronzy-Thomae et al. ............................. | 704/245 |
| 8,705,876 | B2* | 4/2014 | Vaddadi et al. ................ | 382/225 |
| 8,929,600 | B2* | 1/2015 | Liu et al. ........................ | 382/103 |
| 8,958,600 | B2* | 2/2015 | Othmezouri et al. .......... | 382/103 |
| 2002/0028021 | A1* | 3/2002 | Foote et al. .................... | 382/224 |
| 2010/0176952 | A1* | 7/2010 | Bajcsy et al. ............... | 340/573.1 |
| 2013/0117780 | A1* | 5/2013 | Sukthankar et al. ............ | 725/32 |
| 2013/0155229 | A1* | 6/2013 | Thornton et al. .............. | 348/143 |

* cited by examiner

*Primary Examiner* — Sheela C Chawan
(74) *Attorney, Agent, or Firm* — Bryne Poh LLP

(57) ABSTRACT

This disclosure generally relates to systems and methods that facilitate employing exemplar Histogram of Oriented Gradients Linear Discriminant Analysis (HOG-LDA) models along with Localizer Hidden Markov Models (HMM) to train a classification model to classify actions in videos by learning poses and transitions between the poses associated with the actions in a view of a continuous state represented by bounding boxes corresponding to where the action is located in frames of the video.

24 Claims, 11 Drawing Sheets

ACTION RECOGNITION AND DETECTION ON VIDEOS

TECHNICAL FIELD

This disclosure generally relates to systems and methods that facilitate employing an exemplar Histogram of Oriented Gradients Linear Discriminant Analysis (HOG-LDA) templates along with Localizer Hidden Markov Models (HMM) to train a classification model to classify actions in videos by learning poses and transitions between the poses associated with the actions in a view of a continuous state represented by bounding boxes corresponding to where the action is located in frames of the video.

BACKGROUND OF THE INVENTION

Advances in video capture technologies has allowed an average consumer to become a producer of media content using handheld devices, such as mobile phones and camcorders. This media content can be shared through a media sharing technology, for example, a social network, a media content sharing site, email, messaging, or other suitable technologies. Oftentimes, it is advantageous to classify the video or portions of the video according to action(s) contained in the video, such as running, diving, throwing, kicking, falling, swinging, or any other suitable action. For example, a video captured of a child throwing a football at a little league football game can be classified as football or throwing. Conventionally, this classification is performed using manual classification or automatically using global metadata associated with the entire video, such as title, location, interest points, or any other suitable metadata associated with the video. However, these approaches ignore localized spatial and temporal information associated with an action in frames of a video.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a set of training videos respectively classified for an action of a plurality of actions is accessed, a plurality of exemplar Histogram of Oriented Gradients Linear Discriminant Analysis (HOG-LDA) templates are learned using a HOG-LDA model on the a set of training videos, respective sets of candidate bounding boxes for each frame of the set of training videos are estimated using the learned exemplar HOG-LDA templates, wherein each candidate bounding box has an associated template matching score, respective discrete hidden states and a respective bounding box for each discrete hidden state for a plurality of localizer Hidden Markov Models (HMM) are inferred using the estimated sets of candidate bounding boxes, where each localizer HMM is associated with an action of the plurality of actions, and a respective set of parameters for each inferred discrete hidden state of the plurality of localizer HMMs is determined using an objective function.

In accordance with a non-limiting implementation, a HOG-LDA training component is configured to access a set of training videos respectively classified for an action of a plurality of actions and learn a plurality of exemplar Histogram of Oriented Gradients Linear Discriminant Analysis (HOG-LDA) templates using a HOG-LDA model on the a set of training videos, a HOG-LDA scoring component is configured to estimate respective sets of candidate bounding boxes for each frame of the set of training videos using the learned exemplar HOG-LDA templates, wherein each candidate bounding box has an associated template matching score, a Viterbi inference component is configured to infer respective discrete hidden states and a respective bounding box for each discrete hidden state for a plurality of localizer Hidden Markov Models (HMM) using the estimated sets of candidate bounding boxes, where each localizer HMM is associated with an action of the plurality of actions, and an objective maximization component is configured to determine a respective set of parameters for each inferred discrete hidden state of the plurality of localizer HMMs using an objective function.

These and other implementations and embodiments are described in more detail below.

DETAILED DESCRIPTION

Overview

Figure 1:
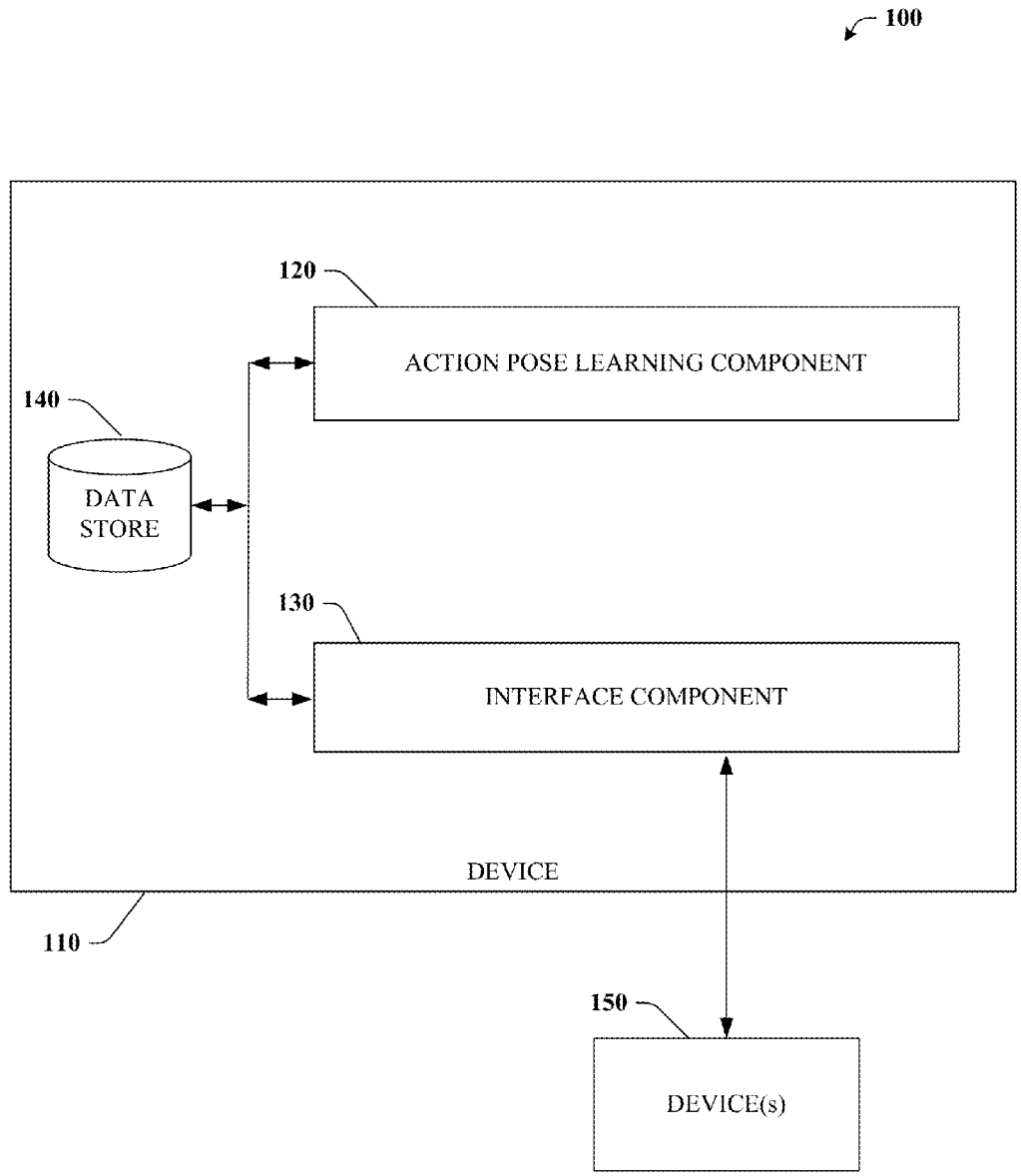
FIG. 1 illustrates a block diagram of an exemplary non-limiting example system 100 for training models to classify actions based upon learning poses and transitions between the poses associated with the actions in a view of a continuous state represented by bounding boxes corresponding to where the action is located in frames of a video in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, a mechanism is provided for training a classification model to classify actions in videos by learning poses and transitions between the poses associated with the actions in a view of a continuous state represented by a bounding box corresponding to where the action is located in frames of the video. A set of training video is accessed, wherein respective videos are classified according to action and comprise a plurality of frames with defined bounding boxes around the area of the frame where action is located. The frames and bounding boxes are employed to train a plurality of exemplar Histogram of Oriented Gradients Linear Discriminant Analysis (HOG-LDA) templates using a HOG-LDA modeling algorithm. The exemplar HOG-LDA templates are employed to train respective localizer Hidden Markov Models (HMM) associated with a set of actions.

While embodiments herein disclose employing exemplar HOG-LDA templates, it is to be appreciated that any suitable localizer template can be employed, non-limiting examples of which include deformable parts models, bag of words models, and deep neural networks.

Figure 4A:
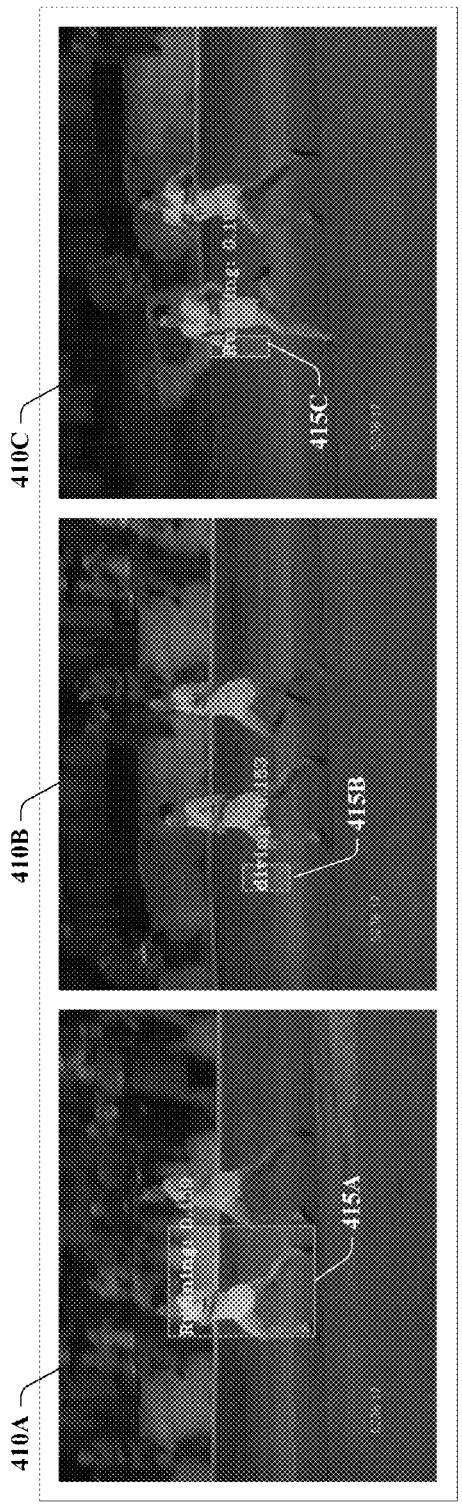
FIG. 4A illustrates exemplary non-limiting frames of a video on which trained exemplar HOG-LDA templates have been applied to the frames to generate bounding boxes and classes for each frame in accordance with an implementation of this disclosure.

Referring to FIG. 4A, in a non-limiting example, are depicted three frames 410A, 410B, and 410C of a video on which trained exemplar HOG-LDA templates have been applied to the frames to generate bounding boxes 415A, 415B, and 415C and classes for each frame. The bounding boxes 415A, 415B, and 415C in each frame are very different. Also, frame 410A has been classified with action "running", frame 410B has been classified with action "diving", and frame 410C has been classified with action "running" by the HOG-LDA templates.

Figure 4B:
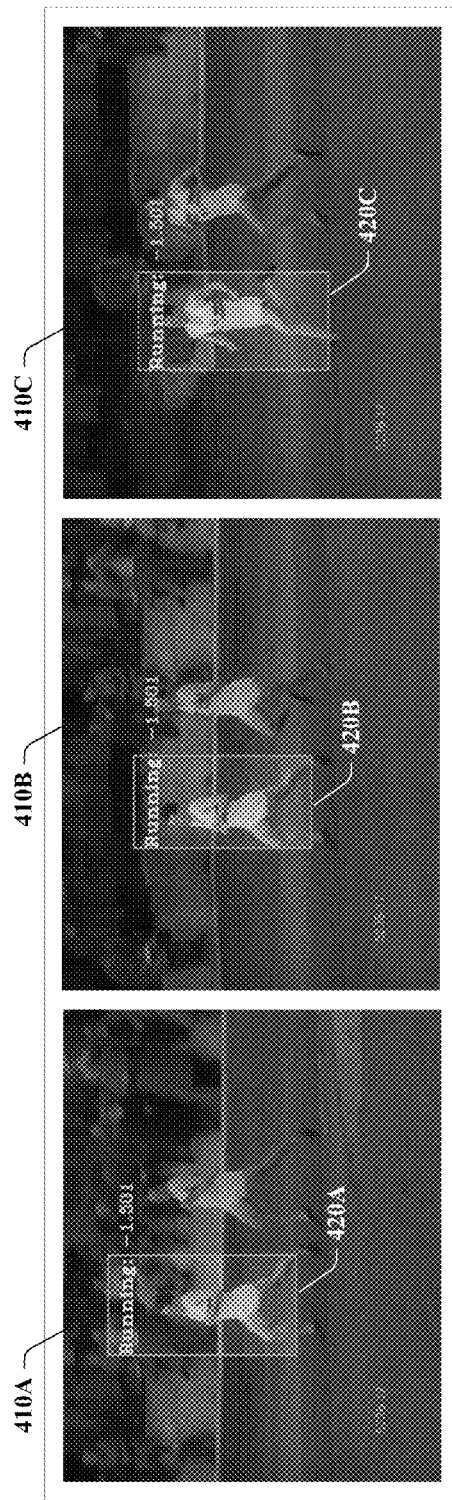
FIG. 4B illustrates exemplary non-limiting frames on which a trained Localizer Hidden Markov Models (HMM) has been applied to smooth out the predictions of trained exemplar HOG-LDA templates in accordance with an implementation of this disclosure.

Referring to FIG. 4B, in a non-limiting example, are depicted the three frames 410A, 410B, and 410C of FIG. 4A on which a trained Localizer Hidden Markov Models (HMM) has been applied to smooth out the predictions of the trained exemplar HOG-LDA templates. The bounding boxes 420A, 420B, and 420C in each frame are more consistent and the all three frames have been classified as action "running".

The localizer HMM is an improvement on a standard HMM where the dynamics of the localizers (e.g. bounding boxes) are modeled using a continuous hidden state. The localizer HMM can be thought of a fusion model that combines cues from neighboring localization outputs and that from a weak frame level localization on the current frame to provide an accurate localization for the entire video. The exemplar HOG-LDA templates learn image based classifiers for predicting the bounding boxes. It can be observed that applying the exemplar HOG-LDA model on videos results in substantially poor localization performance. However, with the application of the localizer HMM to smooth out the predictions of the HOG-LDA outputs, the precision of localization improves substantially, for example, from around 10% to over 70% in experimental results. The training mechanisms learn parameters of the localizer HMM. During inference of the hidden states and bounding boxes, the localizer HMM resembles a switching dynamical model whose continuous state represents the bounding boxes. An approximate Viterbi approach can be employed to solve the inference problem. Advantageously, the application of the localizer HMM to the exemplar HOG-LDA templates results in significantly improved localization in videos using weaker but computationally inexpensive image-level detectors (e.g. exemplar HOG-LDA templates).

Figure 5:
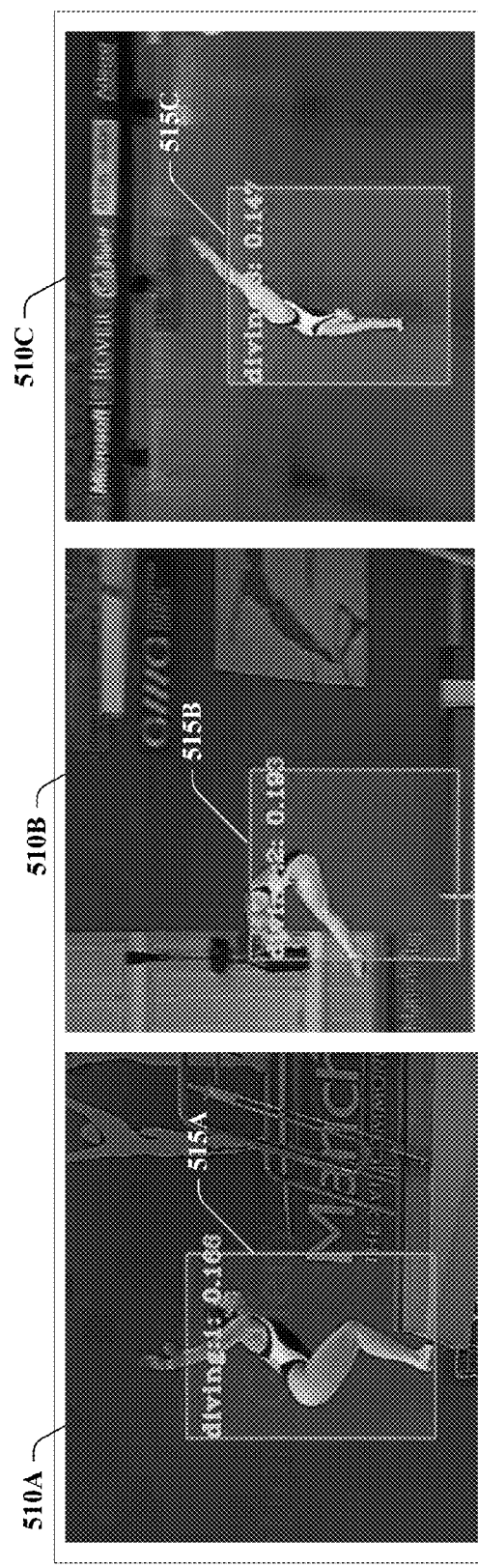
FIG. 5 illustrates exemplary non-limiting frames of a video on which a trained localizer HMM has been applied in accordance with an implementation of this disclosure.

The localizer HMM is trained for action localization that learns both temporal smoothing constraints and pose transitions that an object makes in the course of an action. The framework jointly trains the exemplar HOG-LDA templates with the localizer HMM. The localizer HMM models the dynamics of the bounding boxes using multiple hidden discrete states for each action. Inference on these hidden discrete states leads to natural segmentation of actions into meaningful units (e.g. poses). Referring to FIG. 5, in a non-limiting example, are depicted three frames 510A, 510B, and 510C of a video on which a trained localizer HMM has been applied. The three bounding boxes 515A, 515B, and 515C in the frames 510A, 510B, and 510C are associated with poses corresponding to the three consecutive hidden discrete states in the trained localizer HMM for the action, in this non-limiting example, diving.

A localizer HMM models an action as a conjunction of object poses (e.g., states or sub-actions) along with the transitions between poses. The exemplar HOG-LDA templates model the bounding boxes for each state. The exemplar HOG-LDA templates are re-trained iteratively using the states inferred by an approximate Viterbi algorithm. In order to maintain continuity in the image coordinates of the modeled boundary box locations, a linear dependency between the respective modeled bounding boxes associated with two adjacent states is enforced. The resulting localizer HMM resembles a switching dynamical model. Given a current localizer HMM of the exemplar HOG-LDA templates for each hidden state, an inference can be performed on the localizer HMM to estimate the states and bounding boxes (e.g. location, scale, size, and/or aspect ratio of the bounding box) at each frame (e.g. time).

A significant advantage of the herein approach is the explicit modeling of the poses that an object can take during an action along with learning of valid transitions the object makes between these poses in a joint framework. Additionally, the approach performs simultaneous detection and recognition of actions thus identifying bounding boxes within each frame of the video that are relevant to the action being performed and not just video classification.

Referring now to the drawings, FIG. 1 depicts a system 100 for training models to classify actions based upon learning poses and transitions between the poses associated with the actions in a view of a continuous state represented by bounding boxes corresponding to where the action is located in frames of a video. System 100 includes device 110 that includes action pose learning component 120 that trains localizer HMMs to learn poses and transitions between the poses associated with actions in a view of a continuous state represented by bounding boxes corresponding to where the action is located in frames of the video. Device 110 also includes interface component 130 that that interacts with other device(s) 150 to facilitate exchange of data. Additionally, device 110 includes a data store 140 that can store videos, and data generated and received by device 110, action pose learning component 120, and interface component 130. Data store 140 can be stored on any suitable type of storage device, non-limiting examples of which are illustrated with reference to FIGS. 8 and 9.

Figure 9:
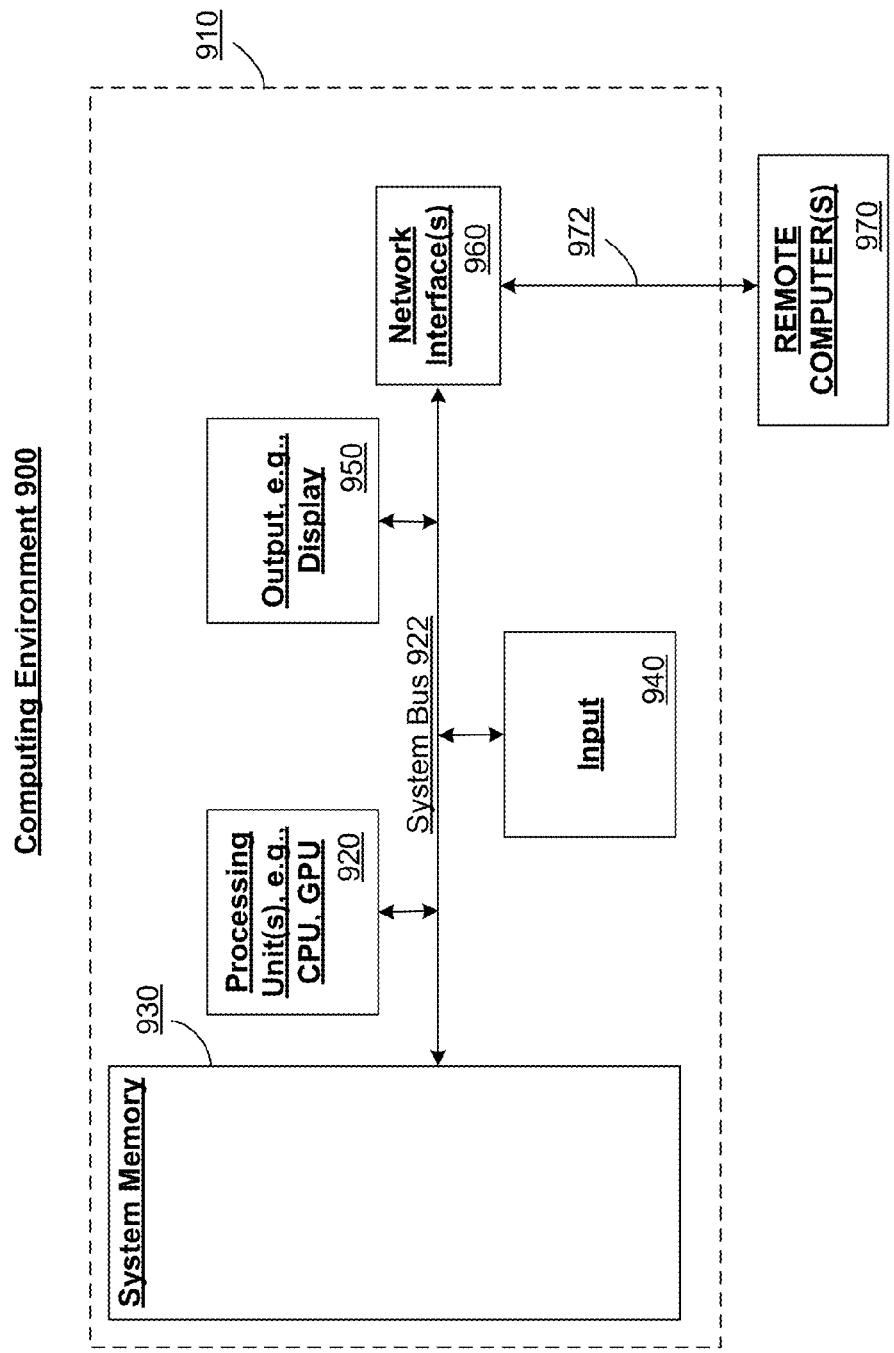
FIG. 9 illustrates a block diagram of an exemplary non-limiting computing system or operating environment in which various embodiments can be implemented.

Device 110 and device 150 include at least one memory that stores computer executable components and at least one processor that executes the computer executable components stored in the memory, a non-limiting example of which can be found with reference to FIG. 9. Device 110 can communicate via a wired and/or wireless network with other devices 150.

Device 110 and device 150 can be any suitable type of device for recording, interacting with, receiving, accessing, or supplying data locally, or remotely over a wired or wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording, interacting with, receiving, accessing, or supplying data that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, Blu-ray device, DVD (digital versatile disc or digital video disc) device, compact disc device, video game system, portable video game console, audio/video receiver, radio device, portable music player, navigation system, car stereo, motion sensor, infrared sensor, or any other suitable device capable of recording, interacting with, receiving, accessing, or supplying data. Moreover, device 110 and device 150 can include a user interface (e.g., a web browser or application), that can receive and present displays and data generated locally or remotely.

Figure 2:
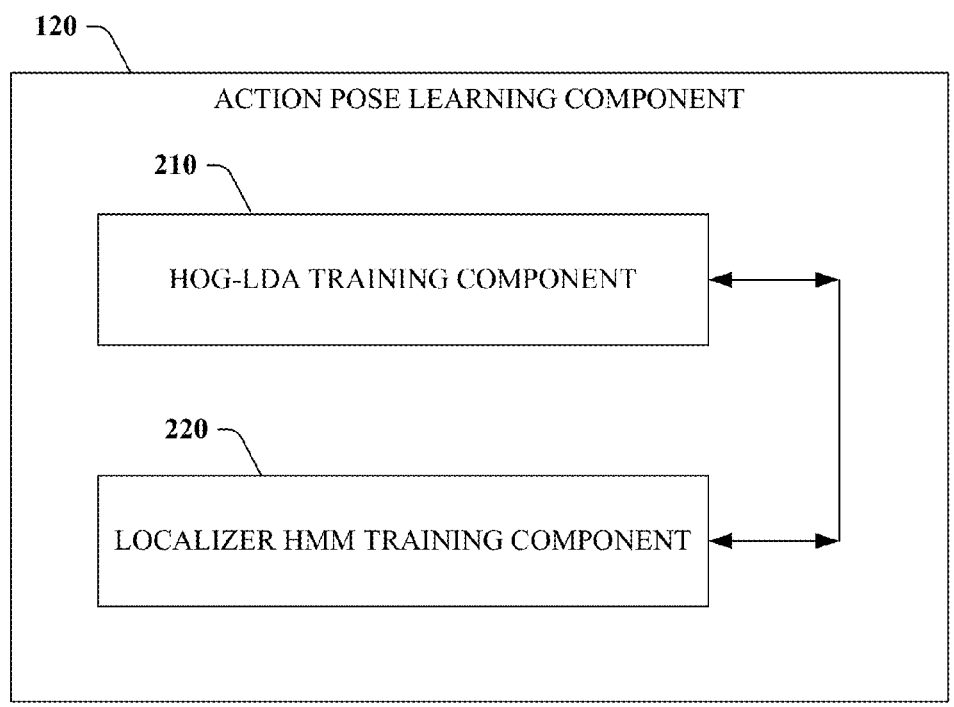
FIG. 2 illustrates a block diagram of an exemplary non-limiting an action pose learning component that trains localizer HMMs to learn poses and transitions between the poses associated with actions in a view of a continuous state represented by bounding boxes corresponding to where the action is located in frames of a video in accordance with an implementation of this disclosure.

FIG. 2 illustrates an action pose learning component 120 that trains localizer HMMs to learn poses and transitions between the poses associated with actions in a view of a continuous state represented by bounding boxes corresponding to where the action is located in frames of a video. Action pose learning component 120 includes a HOG-LDA training component 210 that trains a plurality of exemplar HOG-LDA templates. Action pose learning component 120 also includes localizer HMM training component 220 that trains to trains respective localizer Hidden Markov Models (HMM) associated with a set of actions using outputs from the trained exemplar HOG-LDA templates.

HOG-LDA training component 210 accesses a set of training videos $\{O_1, \ldots, O_j, \ldots, O_N\}$ where N is the number of training videos in the set and j is an integer indexing from 1 to N. Each video $O_j$ in the training set is classified according to action a from a set of actions A (a∈A) and comprises a plurality of frames $oj_1 \ldots oj_{T_j}$, where $T_j$ is the number of frames in video $O_j$. It is to be appreciated that each video O can have a different number of frames T. Additionally, each video $O_j$ in the training set has defined bounding boxes $bj_1 \ldots bj_{T_j}$ around the area in the corresponding frame $oj_1 \ldots oj_{T_j}$ where the action is located. For example, frame $ol_2$ of video $O_1$ would have bounding box $bl_2$. Each bounding box b is specified by its location and size. In an examples herein, b=[x, y, w, h], where x is a horizontal center location of the bounding box b in the frame, y is vertical center location of the bounding box b in the frame, w is the width of the bounding box b, and h is the height of the bounding box b. It is to be appreciated that the bounding box can be specified in any suitable manner. HOG-LDA training component 210 employs a HOG-LDA template training algorithm on the set of training videos $O_1 \ldots O_j \ldots O_N$ to train exemplar HOG-LDA templates that are capable of handling mild variants in the set of training videos. The HOG-LDA template training algorithm first learns a single exemplar HOG-LDA template from a randomly chosen frame o from the set of training videos and greedily removes additional frames o that match (e.g., detected by) the learned exemplar HOG-LDA template. This process is repeated until all the frames o in the set of training videos are either matched to a learned exemplar HOG-LDA template or a new exemplar HOG-LDA template is learned for the frame. The HOG-LDA template training algorithm is as follows:

```
ALGORITHM 1) LearnExemplars(Z =
    {o1₁,...o1_{T₁}, oj₁,...oj_{T_j}, oN₁,...oN_{T_N}, b1₁,...b1_{T₁}, bj₁...bj_{T_j},
    bN₁,...bN_{T_N}})
    L ←{ };
    while Z ≠{ }do
        {o, b} ← Random (Z);
        Q←{ };
        M←LDAModel ({o,b});
        for {o', b'} ∈Z
            b"←Detect ( M, o');
            if Overlap (b", b') > n
                Q ← Q ∪ {o', b'}
            end
        end
        L ← L ∪ M
        Z ← Z \ Q
    end,
    return {L}
``` where Z is the set of all frames in the set of training videos, L is the set of learned exemplar HOG-LDA templates for the set of training videos, Q is uses to track the frames that match a learned exemplar HOG-LDA template M. Function Random (Z) selects a random frame and corresponding bounding box from the set of training videos, Detect (M, o') uses learned exemplar HOG-LDA template M on frame o' to estimate bounding box b", Overlap (b", b') determines if b" has an area that overlaps with b' meeting a threshold n, and LDAModel ({o, b}) employs a HOG-LDA model to learn exemplar HOG-LDA template M from frame o and bounding box b. While any suitable HOG-LDA model can be employed to learn exemplar HOG-LDA template M from frame o and bounding box b, an example HOG-LDA model is described in Bharath Hariharan, Jitendra Malik, and Deva Ramanan (2012). "Discriminative decorrelation for clustering and classification". *Proceedings of the European Conference on Computer Vision (ECCV)* (4), 459-472, the entirety of which is incorporated herein by reference.

Figure 3:
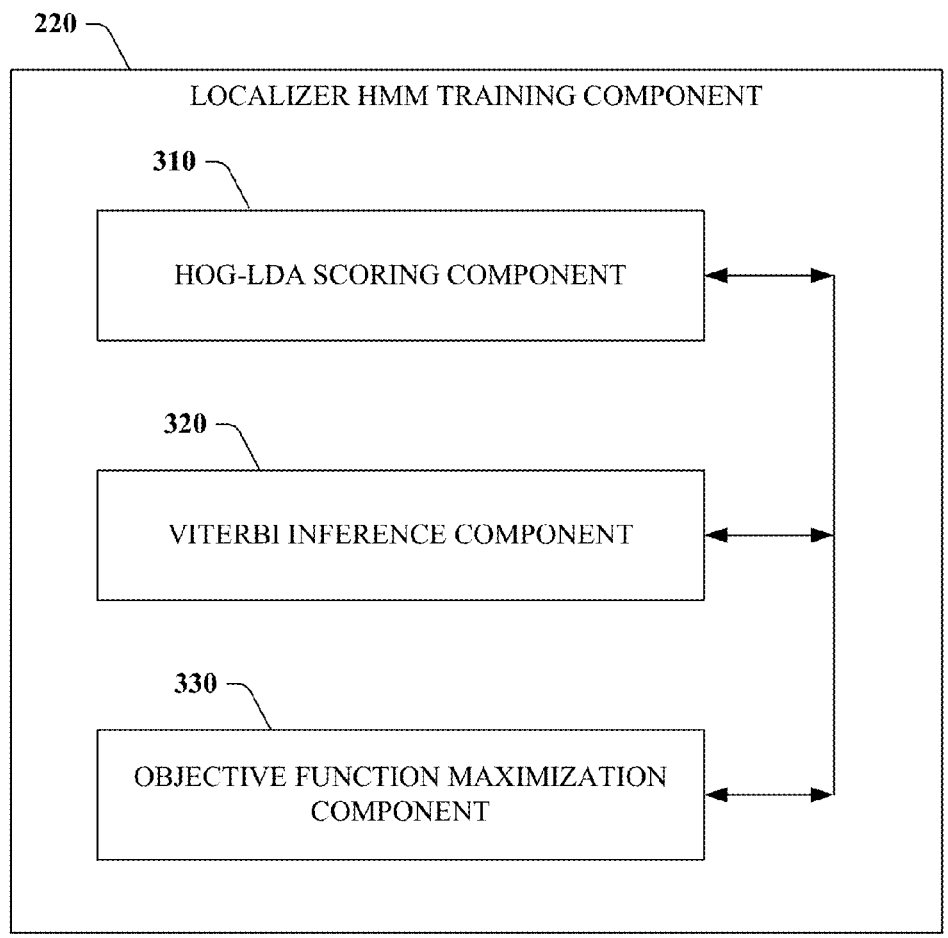
FIG. 3 illustrates a block diagram of an exemplary non-limiting a localizer HMM training component that trains respective localizer HMMs associated with a set of actions using outputs from the trained exemplar HOG-LDA templates in accordance with an implementation of this disclosure.

FIG. 3 illustrates a localizer HMM training component 220 that trains respective localizer HMMs associated with a set of actions using outputs from the trained exemplar HOG-LDA templates from HOG-LDA training component 210. As discussed above each video $O_j$ in the training set is classified according to action a from a set of actions A (a∈A) and comprises a plurality of frames $oj_1 \ldots oj_{T_j}$, where $T_j$ is the number of frames in video $O_j$. Additionally, each video $O_j$ in the training set has defined bounding boxes $bj_1 \ldots bj_{T_j}$ around the area in the corresponding frame $oj_1 \ldots oj_{T_j}$ where the action is located. A localizer HMM $H_a$ models an action a as a conjunction of hidden sub-actions (e.g. poses or states), each of which are modeled as a discrete hidden state of $H_a$. $S_a$ denotes the discrete hidden states of $H_a$. As in a conventional HMM, two of the states in the set $S_a$ will be identified as a unique START and an END state that are not associated with any image frames. The other discrete hidden states model the hidden sub-actions that form the higher level action a. The discrete hidden states are automatically learned by iterative re-assignment and exemplar HOG-LDA templates learning on the set of training videos. Given a learnt model $H_a$, the inference cost on a sequence of frames $oj_{1:T_j} = oj_1 \ldots oj_{T_j}$ along with its bounding boxes $bj_{1:T_j} = bj_1 \ldots bj_{T_j}$ is denoted as $C_{H_a}(oj_{1:T_j}, bj_{1:T_j})$. The inferred action on the sequence of frames $oj_{1:T_j}$ corresponds to the model that assigns the lowest cost. In addition to the inferred action, the localizer HMM $H_a$ also infers the spatial localizations, bounding boxes $bj_{1:T_j}$, as to where the action is located in each frame $oj_{1:T_j}$. This is obtained by solving a minimization problem:

$$\hat{bj}_{1:T_j} = \mathop{argmin}_{bj_{1:T_j}} \left( C_{H_a}(oj_{1:T_j}, bj_{1:T_j}) \right)$$

The lowest inference cost for the model $H_a$ for a sequence of frames $oj_{1:T_j}$ is denoted as follows:

$$\hat{C}_{H_a}(oj_{1:T_j}, bj_{1:T_j}) = \mathop{min}_{bj_{1:T_j}} C_{H_a}(oj_{1:T_j}, bj_{1:T_j})$$

The frames are normalized to unit width and height so that [x, y, w, h] are constrained as follows:

$$o \leq \left( x \pm \frac{w}{2}, y \pm \frac{h}{2} \right) \leq 1.$$

Given a sequence of frames of $oj_{1:T_j}$, the inference problem is to determine the action a in addition to the respective bounding boxes $bj_{1:T_j}$ for each frame $oj_{1:T_j}$. Each localizer HMM $H_a$ is defined by a set of discrete hidden states $S_a$ and a set of edges to transition from one state s' to another state s. There is transition cost $F_{s',s}$ associated with the transition from state s' to state s, where $s' \in S_a$ and $s \in S_a$.

Localizer HMM training component 220 includes HOG-LDA scoring component 310 that employs the trained exemplar HOG-LDA templates to generate candidate bounding boxes for each frame and associated template matching scores. For frame $oj_i$, where i is an integer from 1 to $T_j$, HOG-LDA scoring component 310 uses exemplar HOG-LDA template $L_{s_i}$ for state s, corresponding to frame $o_i$ to estimate k candidate bounding boxes $\widetilde{B}_{J_i}(oj_i, L_{s_i}) = \widetilde{b}_{J_{i_1}}(oj_i, L_{s_i}) = \widetilde{b}_{J_{i_1}} \ldots \widetilde{b}_{J_{i_k}}$ along with a corresponding template matching score $rj_{i_{1:k}}(oj_i, L_{s_i}) = rj_{i_1} \ldots rj_{i_k}$, where k is the number of candidate bounding boxes. It is to be appreciated that k can be predefined or dynamically determined HOG-LDA scoring component 310 does this by first computing a feature pyramid on the entire frame $oj_i$ and convolving exemplar HOG-LDA template $L_{s_i}$ with frame $oj_i$ various scales and locations. Each pair of scale and location is associated with a bounding box $bj_i$. HOG-LDA scoring component 310 selects the top k scoring bounding boxes. In an embodiment, a non-max suppression can optionally be applied to avoid outputting very similar bounding boxes. For example, bounding boxes that have at least a threshold amount of overlap with a previous bounding box at a current scale can be suppressed.

Each hidden state $s_i$ (that is not a START or a END state), has a defined set of parameters $\Theta_{s_i} = [\alpha_{s_i}, \mu_{s_i}, \lambda_{s_i}^w, \lambda_{s_i}^h, \lambda_{s_i}^t, \lambda_{s_i}^l]$. There is an estimated mean width $\overline{w}_{s_i}$ and an estimated mean height $\overline{h}_{s_i}$ of the bounding boxes inferred for state $s_i$. The estimated mean width $\overline{w}_{s_i}$ and height $\overline{h}_{s_i}$ re-estimated at each iteration as the mean of the given bounding boxes b that correspond to the frames o of the set of training videos that align with state $s_i$. Parameters $\lambda_{s_i}^w$ is the width penalty weight for an inferred bounding box to deviate from the estimated mean width $\overline{w}_{s_i}$ and $\lambda_{s_i}^h$ is the height penalty weight for an inferred bounding box to deviate from the estimated mean height $\overline{h}_{s_i}$. Thus, for an inferred bounding box $\hat{b}$ having width $w_b$ and height $h_b$ for a given frame using state s, the incurred cost is $\lambda_{s_i}^w(w_b - \overline{w}_{s_i})^2 + \lambda_{s_i}^h(h_b - \overline{h}_{s_i})^2$.

Additionally, there is a temporal consistency cost weight $\lambda_{s_i}^t$ associated with state $s_i$ that defines the cost for an inferred bounding box $\hat{b}_{J_i}$ corresponding to frame $oj_i$ (e.g. state $s_i$) to deviate from an inferred bounding box $\hat{b}_{J_{i-1}}$ corresponding to immediately preceding frame $oj_{i-1}$ (e.g. state $s_{i-1}$) in the sequence of frames $oj_{1:T_j}$. Therefore, the temporal consistency cost is $\lambda_{s_i}^t \|\hat{b}_{J_i} - \hat{b}_{J_{i-1}}\|_2^2$.

Furthermore, there is a template consistency cost weight $\lambda_{s_i}^l$ that defines the cost for an inferred bounding box $\hat{b}_{J_i}$ corresponding to frame $oj_i$ to deviate from the candidate bounding $\widetilde{b}_{J_i}$ corresponding to frame $o_i$ output from the exemplar HOG-LDA template $L_{s_i}$ for state $s_i$. The inference process involves choosing one of the candidate bounding boxes $\widetilde{b}_{J_{i_{1:k}}}(oj_i, L_{s_i})$ for state $s_i$. Therefore, for an inferred bounding box $\hat{b}_{J_i}$ and candidate bounding $\widetilde{b}j_i$, added template consistency cost to the inference is $\lambda_{s_i}^l \|\hat{b}_{J_i} - \widetilde{b}_{J_i}\|$. It is to be appreciated that if $\lambda_{s_i}^l$ is set to $\infty$, the inferred bounding box $\hat{b}_{J_i}$ always matches one of the candidate bounding boxes $\widetilde{b}_{J_{i_{1:k}}}(oj_i, L_{s_i})$. The inference process herein allows $\lambda_{s_i}^l$ to freely vary such that the localizer HMM $H_a$ can pick the inferred bounding box $\widetilde{b}_{J_i}$ that yields the best inference cost $C_{H_a}(oj_{1:T_j}, \hat{b}_{J_{1:T_j}})$.

Moreover, the template matching scores $rj_{i_{1:k}}(oj_i, L_{s_i})$ are calibrated across the set of actions A by learning scale $\alpha_{s_i}$ and offset $\mu_{s_i}$ parameters to transform the template matching scores $rj_{i_{1:k}}(oj_i, L_{s_i})$ using $\alpha_{s_i} + \mu_{s_i} rj_i$.

Localizer HMM training component 220 also includes Viterbi inference component 320 that, for each training video $O_j$, determines (e.g. estimates or infers) a valid sequence of hidden discrete states $s_{1:T_j}$ where $s_t \in S_a$ of localizer HMM $H_a$, a sequence of matched bounded boxes $\widetilde{b}_{J_{1:T_j}}$ where $\widetilde{b}_{J_i} \in \widetilde{B}_{J_i}(oj_i, L_{s_i})$, and a sequence of inferred bounding boxes $\hat{b}_{J_{1:T_j}} = \hat{b}_{J_1} \ldots \hat{b}_{J_{T_j}}$ that minimizes the cost function:

$$C_{H_a}(oj_{1:T_j}, (\hat{bj})_{1:T_j}) = \sum_{i=1}^{T_j} (\alpha_{s_i} + \mu_{s_i} rj_i) + \sum_{i=1}^{T_j} \left[ \lambda_{s_i}^w (w_{b\hat{j}_i} - \overline{w}_{s_i})^2 \right] + \sum_{i=1}^{T_j} \left[ \lambda_{s_i}^h (h_{b\hat{j}_i} - \overline{h}_{s_i})^2 \right] +$$

-continued $$\sum_{i=1}^{T_j} [\lambda_{s_i}^t \|\hat{bj}_i - \hat{bj}_{i-1}\|_2^2 + \lambda_{s_i}^l \|\hat{bj}_i - \tilde{bj}_i\|_2^2] + \sum_{i=1}^{T_j} F_{s_{i-1},s_i} + F_{s_{T_j},s_{END}}$$

where,
$s_0$ = START state,
$0 \le x_{\tilde{b}_{J_i}} \pm w_{\tilde{b}_{J_i}} \le 1$,
$0 \le h_{\tilde{b}_{J_i}} \pm h_{\tilde{b}_{J_i}} \le 1$,
$\tilde{b}_{J_i} \in \tilde{B}_{J_i} (oj_i, L_{s_i})$, and
$rj_i$ is the score of $\tilde{b}_{J_i}$.

At each frame $oj_i$, the set of all discrete hidden states in the HMM lattice is the union of all exemplar HOG-LDA template matched outputs from all the discrete states corresponding to the localizer HMM $H_a$. Thus, if there are $|S_a|$ discrete states for action a and k top bounding boxes output per state, a total of $k|S_a|$ states are present at any time in the HMM lattice. This resembles the inference problem of a switching dynamical system. Viterbi inference component 320 employs a Viterbi inference algorithm to make a forward pass to infer the best discrete hidden state $\hat{s}_i$ and the best bounding box $\hat{b}_{J_i}$ at each frame $oj_i$ given the inferred state $\hat{s}_{i-1}$ and the best bounding box $\hat{b}_{J_{i-1}}$ for frame $oj_i$. Fixing the inferred bounding boxes $\hat{b}_{J_{1:T_j}}$ for each frame $oj_{1:T_j}$, a backtracking is performed to infer the underlying discrete hidden states $\hat{s}_{1:T_j}$.

The Viterbi algorithm performs an inference on $[\tilde{B}_{J_i} (oj_i, L_{s_i}), \Theta_{s_i}]_{s_i \in S_a, i=1:T_j}$ as follows:

```
ALGORITHM 2) ViterbiInference ([B̃_Ji (oj_i, L_si), Θ_si]_si∈Sa,i=1:Tj)
b̃_J0 ← [½, ½, ½, ½];

B̃_J0 (oj_0,L_sSTART) ← {b̃_J0}
Vj_0 (START,B̃_J0 (oj_0, L_sSTART)) ← 0;
for i ← 1 to T + 1 do
    Vj_i(s_i,b̃_Ji) ← ∞;
    for (s_i, s_i-1) ∈ S_a do
        for b̃_Ji ∈ B̃_Ji (oj_i, L_si) do
            for b̃_Ji-1 ∈ B̃_Ji-1 (oj_i-1, L_si-1) do
                (c, b') ← Smooth(BestBox(s_i-1,b̃_Ji-1), b̃_Ji, Θ_si);
                Vj_new ← c + F_s_i-1,s_i + Vj_i-1(s_i-1,b̃_Ji-1) + rj_i;
                if Vj_new < Vj_i(s_i,b̃_Ji) then
                    Vj_i(s_i,b̃_Ji) ← Vj_new;
                    Backtrack(s_i,b̃_Ji) ← (s_i-1,b̃_Ji-1);
                    BestBox(s_i,b̃_Ji) ← b';
                end
            end
        end
    end
end
s_i+1 ← END state
b̃_Ji+1 ← φ;
for i ← T + 1 to 1 do
    (ŝ_i-1,b̃_Ji-1) ← Backtrack (ŝ_i,b̃_Ji);
        ← BestBox)(s_i-1,b̃_Ji-1)
end
return {Vj_T+1(END, φ), ŝ_1:Tj, b̂_J1:Tj}
``` where φ represents a NULL value (e.g. empty or no value), c is the value of $C_{H_a}(oj_{1:T_j}, \hat{b}_{J_{1:T_j}})$ at b', and b' is set to $\tilde{b}_{J_i}$ from the Smooth function.

In the Viterbi inference algorithm, function BestBox($s_i$, $\tilde{b}_{J_i}$) returns the best bounding box $\hat{b}_{J_i}$ at frame $oj_i$ given all of the bounding boxes for frames $oj_{1:i}$ given a selected exemplar HOG-LDA template $L_{s_i}$. Function Smooth ($\tilde{b}_{J_i}$, $\hat{b}_{J_i}$, $\Theta_{s_i}$) is $\hat{b}_{J_i}, \tilde{b}_{J_i}, \Theta_{s_i}$) is determined by:

$$\underset{\hat{bj}_i}{argmin} \left( \lambda_{s_i}^w (w_{\hat{bj}_i} - \bar{w}_{s_i})^2 + \lambda_{s_i}^h (h_{\hat{bj}_i} - \bar{h}_{s_i})^2 + \lambda_{s_i}^t \|\hat{bj}_i - \hat{bj}_{i-1}\|_2^2 + \lambda_{s_i}^l \|\hat{bj}_i - \tilde{bj}_i\|_2^2 \right)$$

subject to the constraints on [x, y, w, h] as follows:

$$0 \le \left( x \pm \frac{w}{2}, y \pm \frac{h}{2} \right) \le 1,$$

Which is solved by employing a least squares constraint optimization algorithm. Backtrack is an array (e.g. hash map) indexed by hidden state and associated bounding box.

Localizer HMM training component 220 also includes objective function maximization component 330 that, for each training video $O_j$, learns (e.g. determines or infers) the set of parameters $\Theta_{s_i} = [\alpha_{s_i}, \mu_{s_i}, \lambda_{s_i}^w, \lambda_{s_i}^h, \lambda_{s_i}^t, \lambda_{s_i}^l]$ for each hidden discrete state $s_{1:T_j}$. The goal is to learn the set of parameters $\Theta_{s_i}$ so as to maximize the correlation between localizer HMM $H_a$ localization and classification to match action a and bounding box $bj_1$ for frame $oj_i$. Objective function maximization component 330 employs a discriminative technique to obtain the weights of the localizer HMM $H_a$ classes. Conventional HMMs employ generative based models which do not have discriminative power to classify actions. This is particularly significant in view of the mechanism described herein that weigh HOG-LDA scores with that of the transition cost and the localization (e.g. boundary box) dynamics.

As discussed above, for a given training video $O_j$ with a sequence of frames $oj_{1:T_j}$ and bounding boxes $bj_{1:T_j}$, the optimal cost is $\hat{C}_{H_a}(oj_{1:T_j}, \hat{b}j_{1:T_j})$. The classification probability $p_a(oj_{1:T_j})$ for an action a for a sequence of frames of $oj_{1:T_j}$ is the soft-max of the cost assigned by its localizer HMM $H_a$ against cost assigned for all other actions a' by their localizer HMM $H_{a'}$, which is specified as follows:

$$p_a(oj_{1:T_j}) = \frac{\exp(-\hat{C}_{H_a}(oj_{1:T_j}, bj_{1:T_j}))}{\sum_{a' \in A} \exp(-\hat{C}_{H_{a'}}(oj_{1:T_j}, bj_{1:T_j}))}$$

Given bounding boxes $B = bj_{1:T_j}$ provided with a sequence of frames $oj_{1:T_j}$ and the inferred bounding boxes $B_{H_a}(oj_{1:T_j}) = \hat{b}_{J_{1:T_j}}$ for action a, an overlap function G is defined as follows:

$$G(B_{H_a}(oj_{1:T_j}), B) = \eta \sum_{i=1}^{T_j} \frac{|\hat{bj}_i \cap bj_i|}{|\hat{bj}_i \cup bj_i|}$$

where the intersection of two bounding boxes $\hat{b}_{J_i}$ and $bj_i$ is the common area between them, and the union of the two bounding boxes $\hat{b}_{J_i}$ and $bj_i$ is the total area under the them minus the intersection of the two bounding boxes $\hat{b}_{J_i}$ and $bj_i$. Objective function maximization component 330 uses techniques to maximize an overall objective function $f(\Theta)$ defined as follows:

$$f(\Theta) = \Sigma_{j=1}^N [\log p_a(oj_{1:T_j}) + G(B_{H_a}(oj_{1:T_j}), B)],$$

where Θ denotes all of the parameters for discrete hidden states $s_{1:T_j}$ of localizer HMM $H_a$. At the extremes, if η=0, objective function $f(\Theta)$ is maximized only for classification accuracy, and if η=∞, objective function $f(\Theta)$ is maximized only for localization accuracy. In order to determine the parameters Θ, objective function maximization component 330 employs a gradient ascent based approach for maximizing objective function $f(\Theta)$. To simply the operation, objective function maximization component 330 can compute a derivative $f'(\Theta)$ using the first rule of differentiation with a specified step size, such as in a non-limiting example step size 0.001. It is to be appreciated that any suitable step size can be employed. In an embodiment, the parameters Θ can be constrained to have non-negative values. There are also the transition costs $F_{s',s}$, which are set to ∞ for non-consecutive states and otherwise set to zero. In an embodiment, objective function maximization component 330 does not learn transition costs $F_{s',s}$. However, training mechanisms can be employed to learn transition costs $F_{s',s}$. In each iteration of the gradient ascent, objective function maximization component 330 updates that parameters Θ in the direction of the gradient ascent and computes the updating step size using a line search technique. If each action a∈A is modeled with q states, and there are |A| actions, and 6 parameters Θ for each state, then objective function maximization component 330 is optimizing a total number of parameters equal to the product of 6|A|q for a full gradient computation, which can be very computationally complex. In an optional embodiment, objective function maximization component 330 can reduce the computational complexity of a full gradient computation by generating a random direction according to a Normal distribution with mean equal to zero and a standard deviation of $\mathcal{N}(0, 1)$. This reduces the time and complexity for performing the optimization of the parameters Θ with the tradeoff of possibly providing less optimized parameters Θ than the full gradient approach.

Figure 6:
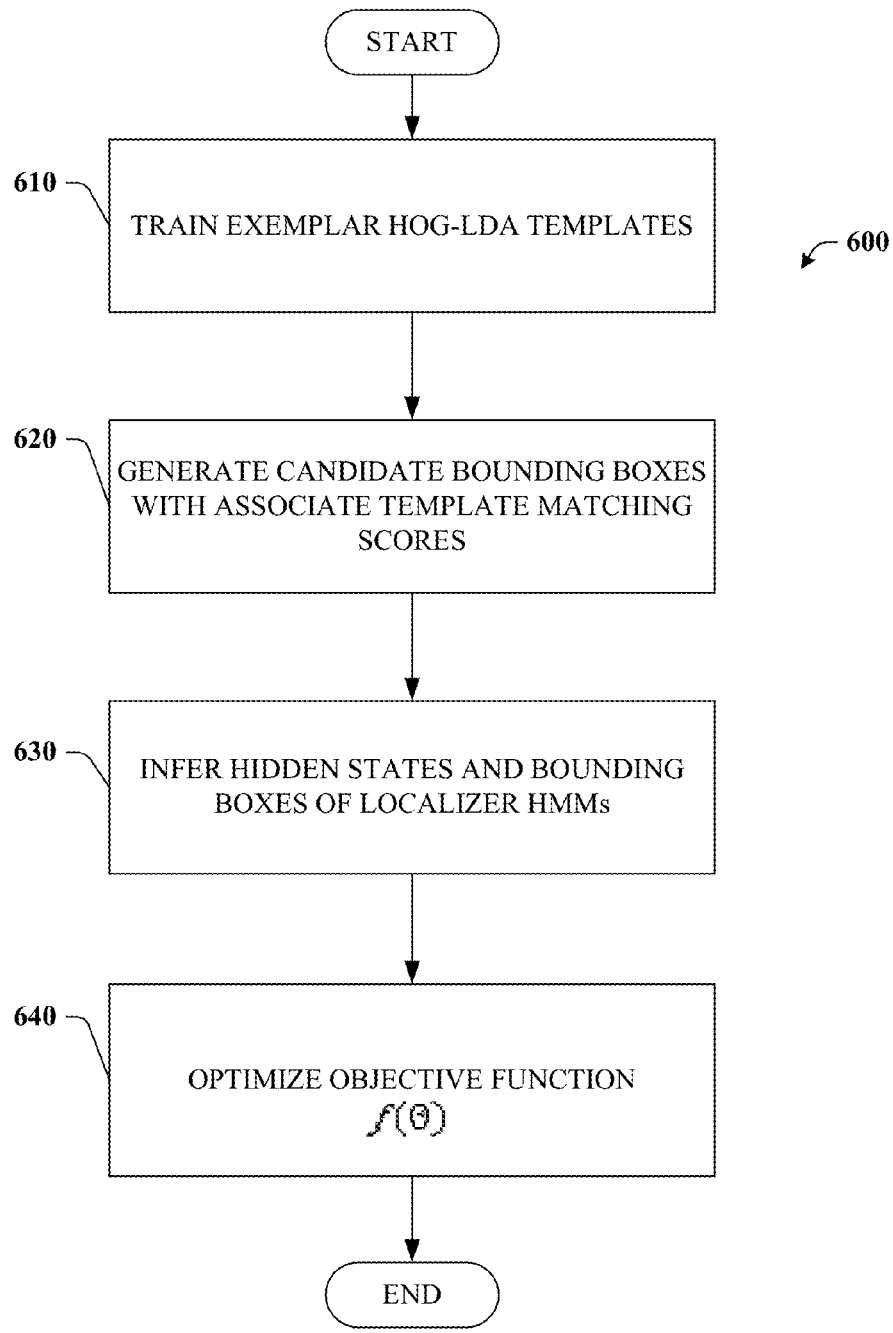
FIG. 6 illustrates an exemplary non-limiting flow diagram for training models to classify actions based upon learning poses and transitions between the poses associated with the actions in a view of a continuous state represented by bounding boxes corresponding to where the action is located in frames of a video in accordance with an implementation of this disclosure.
Figure 7A:
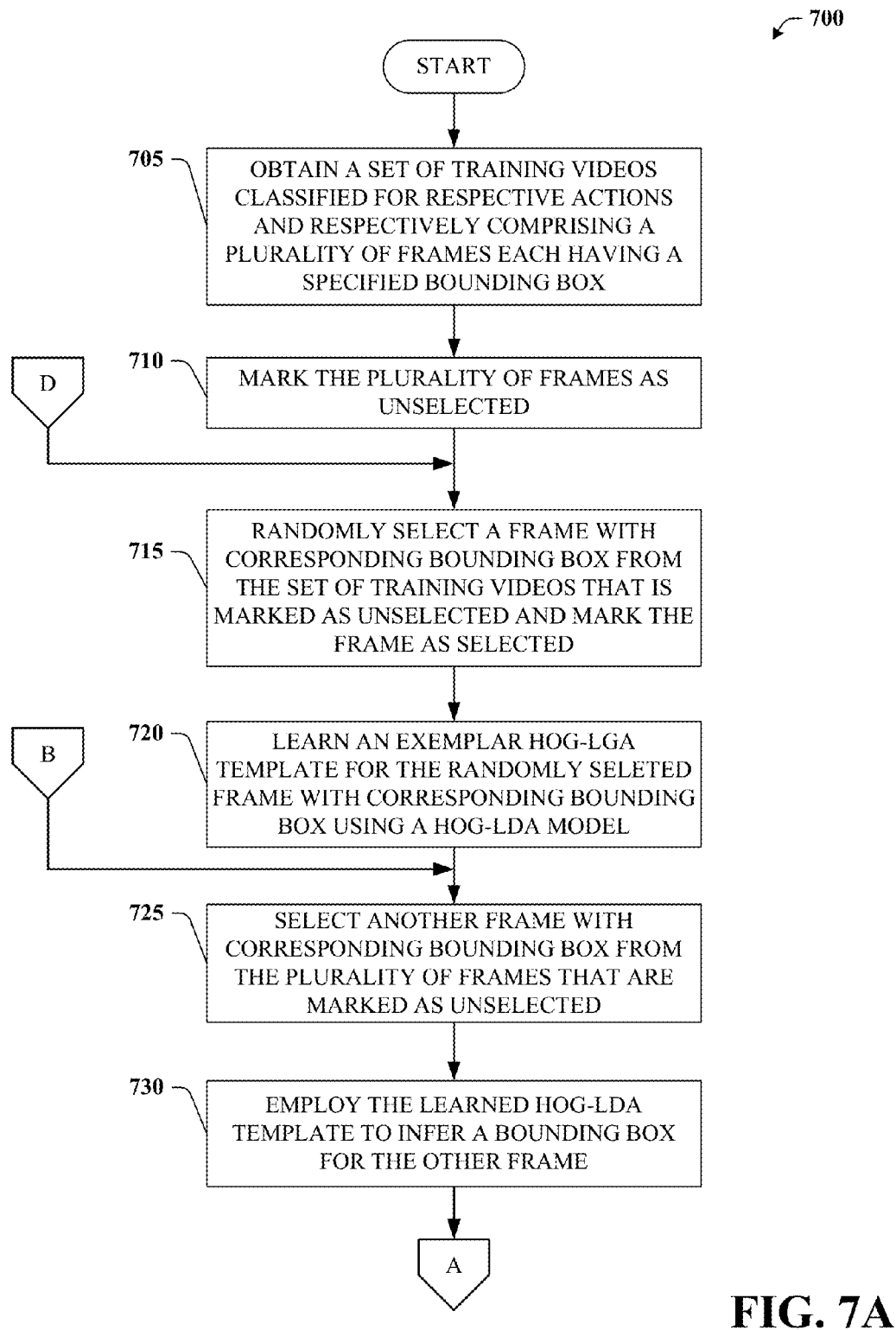
FIGS. 7A, 7B, and 7C illustrate an exemplary non-limiting flow diagram for training a plurality of exemplar HOG-LDA templates in accordance with an implementation of this disclosure.
Figure 7B:
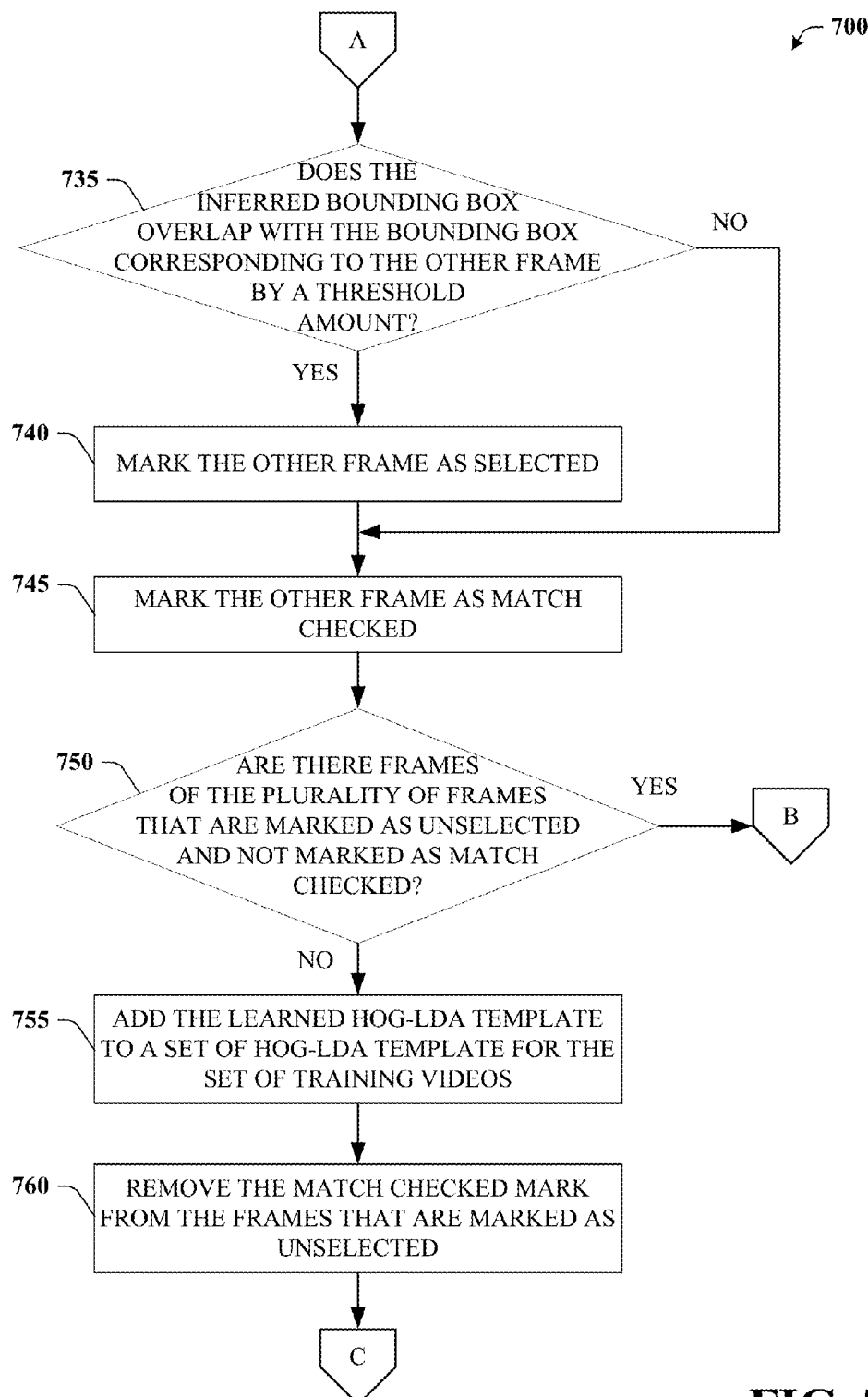
Figure 7C:
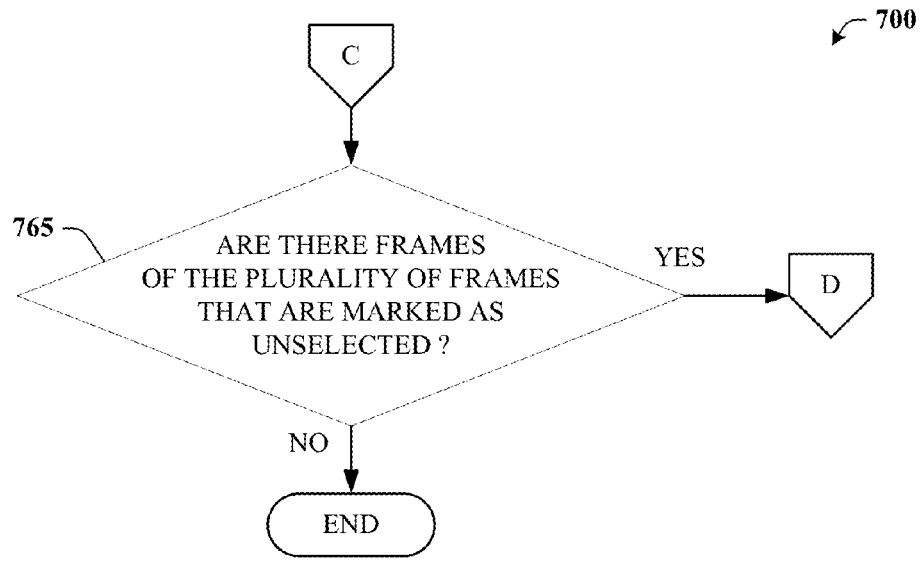

FIGS. 6-7 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Referring to FIG. 6, is depicted an exemplary method 600 for training models to classify actions based upon learning poses and transitions between the poses associated with the actions in a view of a continuous state represented by bounding boxes corresponding to where the action is located in frames of a video. At reference numeral 610, a plurality of exemplar HOG-LDA templates are trained from a set of training videos, where each video in the training set is classified according to action from a set of actions and comprises a plurality of frames having defined bounding boxes around the area in the corresponding frame where the action is located (e.g., by a HOG-LDA training component 210 or an action pose training component 120). At reference numeral 620, candidate bounding boxes with associated scores are generated for each frame in the training set of videos (e.g., by a HOG-LDA scoring component 310, a localizer HMM training component, or an action pose training component 120). At reference numeral 630, discrete hidden states and bounding boxes for each state are inferred for each action (e.g., by a Viterbi inference component 320, a localizer HMM training component, or an action pose training component 120). At reference numeral 640, parameters associated with each state are identified by optimizing an overall objective function $f(\Theta)$ (e.g., by an objection junction maximization component 330, a localizer HMM training component, or an action pose training component 120).

Referring to FIG. 7, is depicted an exemplary method 700 for training a plurality of exemplar HOG-LDA templates, for example with respect to element 610 of method 600 (e.g., by a HOG-LDA training component 210 or an action pose training component 120). At reference numeral 705, a set of training videos, where each video in the training set is classified according to action from a set of actions and comprises a plurality of frames having defined bounding boxes around the area in the corresponding frame where the action is located is accessed (e.g., by a HOG-LDA training component 210 or an action pose training component 120). At reference numeral 710, all frames of the set of training videos are marked as unselected. At reference numeral 715, a frame marked as unselected with its corresponding bounding box is randomly selected from the set of training videos. At reference numeral 720, an exemplar HOG-LDA template is learned for the randomly selected frame using a HOG-LDA model. At reference numeral 725, another frame marked as unselected with its corresponding bounding box is randomly selected from the set of training videos. At reference numeral 730, the learned exemplar HOG-LDA template is employed on the other randomly selected frame to infer a bounding box for the other frame.

At reference numeral 735, a determination is made whether the inferred bounding box for the other frame overlaps by a threshold amount with the bounding box associated with the frame used to learn the exemplar HOG-LDA template. If the determination at 735 is "NO" meaning that a determination has been made that the inferred bounding box for the other frame does not overlap by the threshold amount with the bounding box associated with the frame used to learn the exemplar HOG-LDA template, the method proceeds to element 745. If the determination at 735 is "YES" meaning that a determination has been made that the inferred bounding box for the other frame does overlap by the threshold amount with the bounding box associated with the frame used to learn the exemplar HOG-LDA template, the method proceeds to element 740. At reference numeral 740, the other frame is marked as selected to indicate that its bounding box for this learned exemplar HOG-LDA template overlapped (e.g., matched) the bounding box associated with the frame used to learn the exemplar HOG-LDA template. At reference numeral 745, the other frame is marked as match checked to indicate that its bounding box for this learned exemplar HOG-LDA template was checked for overlap.

At reference numeral 750, a determination is made whether there are frames in the set of training videos that are marked as unselected and not marked as match checked. If the determination at 735 is "YES" meaning that a determination has been made that there are frames in the set of training videos marked as unselected and not marked as match checked, the method proceeds to element 725. If the determination at 735 is "NO" meaning that a determination has been made that there are no frames in the set of training videos marked as unselected and not marked as match checked, the method proceeds to element 755. At reference numeral 755, the learned exemplar HOG-LDA template is added to a set of learned exemplar HOG-LDA template. At reference numeral 760, all frames in the set of training videos that are marked as unselected have their match checked mark cleared.

At reference numeral 765, a determination is made whether there are frames in the set of training videos that are marked as unselected. If the determination at 765 is "YES" meaning that a determination has been made that there are frames in the set of training videos marked as unselected, the method proceeds to element 715. If the determination at 735 is "NO" meaning that a determination has been made that there are no frames in the set of training videos marked as unselected, the method ends.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
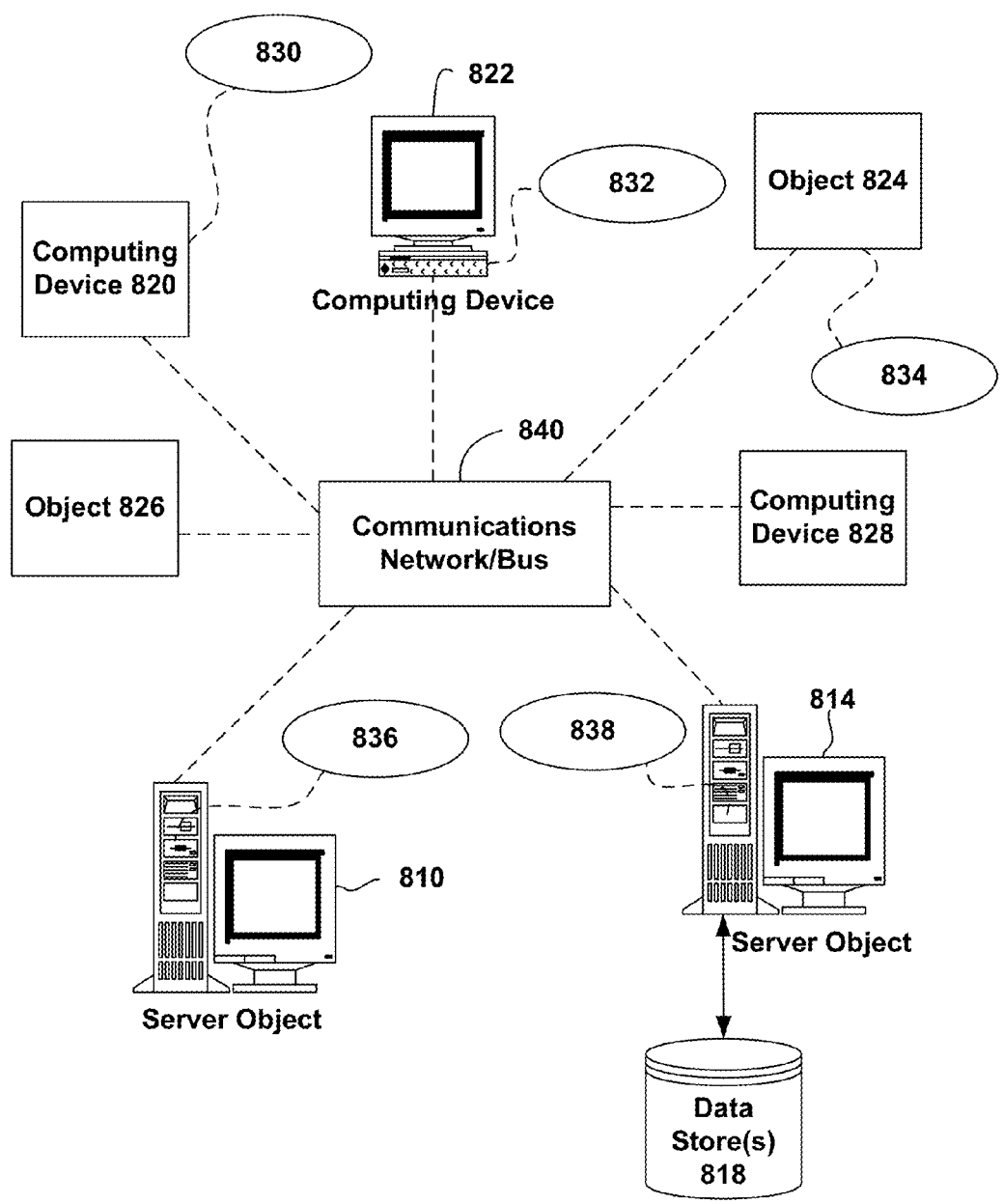
FIG. 8 illustrates a block diagram of an exemplary non-limiting networked environment in which various embodiments can be implemented.

FIG. 8 provides a schematic diagram of an exemplary networked or distributed computing environment. The distributed computing environment comprises computing objects 810, 812, etc. and computing objects or devices 818, 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 818, 820, 822, 824, 826, 828, etc. may comprise different devices, such as personal digital assistants (PDAs), audio/video devices, mobile phones, MP3 players, personal computers, laptops, tablets, etc.

Each computing object 810, 812, etc. and computing objects or devices 818, 820, 822, 824, 826, 828, etc. can communicate with one or more other computing objects 810, 812, etc. and computing objects or devices 818, 820, 822, 824, 826, 828, etc. by way of the communications network 840, either directly or indirectly. Even though illustrated as a single element in FIG. 8, network 840 may comprise other computing objects and computing devices that provide services to the system of FIG. 8, and/or may represent multiple interconnected networks, which are not shown. Each computing object 810, 812, etc. or computing objects or devices 818, 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 818, 820, 822, 824, 826, 828, etc. can be thought of as clients and computing objects 810, 812, etc. can be thought of as servers where computing objects 810, 812, etc. provide data services, such as receiving data from client computing objects or devices 818, 820, 822, 824, 826, 828, etc., storing of data, processing of data, transmitting data to client computing objects or devices 818, 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 810, 812, etc. can be Web servers, file servers, media servers, etc. with which the client computing objects or devices 818, 820, 822, 824, 826, 828, etc. communicate via any of a number of known protocols, such as the hypertext transfer protocol (HTTP). Objects 810, 812, etc. may also serve as client computing objects or devices 818, 820, 822, 824, 826, 828, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 9 is but one example of a computing device that can be employed with implementing one or more of the systems or methods shown and described in connection with FIGS. 1-8. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing environment 900 be interpreted as having any dependency or requirement relating to any one or combination of components illustrated in the exemplary operating environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970 via a network interface 960. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:
accessing, by a system including a processor, a set of training videos respectively classified for an action of a plurality of actions;
learning, by the system, a plurality of exemplar Histogram of Oriented Gradients Linear Discriminant Analysis (HOG-LDA) templates using a HOG-LDA model on the a set of training videos;
estimating, by the system, respective sets of candidate bounding boxes for each frame of the set of training videos using the learned exemplar HOG-LDA templates, wherein each candidate bounding box has an associated template matching score;
inferring, by the system, respective discrete hidden states and a respective bounding box for each discrete hidden state for a plurality of localizer Hidden Markov Models (HMM) using the estimated sets of candidate bounding boxes, where each localizer HMM is associated with an action of the plurality of actions; and determining, by the system, a respective set of parameters for each inferred discrete hidden state of the plurality of localizer HMMs using an objective function.

2. The method of claim 1, wherein respective videos of the set of training videos comprise a plurality of frames respectively comprising a bounding box around area of the frame corresponding to the action to which the video is classified.

3. The method of claim 2, wherein the objective function considers an overlap function comparing inferred bounding boxes for each frame of the set of training videos with corresponding bounding boxes included with each frame of the set of training videos.

4. The method of claim 1, wherein the set of parameters comprises:
   a width penalty weight for an inferred bounding box for the discrete hidden state to deviate from an estimated mean width of bounding boxes associated with the discrete hidden state; and
   a height penalty weight for the inferred bounding box for the discrete hidden state to deviate from an estimated mean height of bounding boxes associated with the discrete hidden state;
   a temporal consistency cost for the inferred bounding box for the discrete hidden state to deviate from an previous inferred bounding box for a previous discrete hidden state immediately preceding the discrete hidden state in a sequence of discrete hidden states associated with a localizer HMM;
   a template consistency cost for the inferred bounding box for the discrete hidden state to deviate from a candidate bounding box for the discrete hidden state;
   a scale for calibrating template matching scores associated with the discrete hidden state across the set of actions; and
   an offset for calibrating template matching scores associated with the discrete hidden state across the set of actions.

5. The method of claim 1, wherein the inferring the respective discrete hidden states and a respective bounding box for each discrete hidden state for the plurality of localizer Hidden Markov Models (HMM) comprises employing a Viterbi inference algorithm on the estimated sets of candidate bounding boxes.

6. The method of claim 1, wherein the determining the respective set of parameters for each inferred discrete hidden state of the plurality of localizer HMMs comprises employing a gradient based approach on the objective function.

7. The method of claim 6, wherein the employing a gradient based approach on the objective function comprises generating a random direction.

8. The method of claim 1, wherein the objective function considers a soft-max of the cost of associated with a localizer HMM associated with an action against costs associated with other localizer HMMs associated with other actions.

9. A non-transitory computer-readable medium having instructions stored thereon that, in response to execution, cause a system including a processor to perform operations comprising:
   accessing a set of training videos respectively classified for an action of a plurality of actions;
   learning a plurality of exemplar Histogram of Oriented Gradients Linear Discriminant Analysis (HOG-LDA) templates using a HOG-LDA model on the a set of training videos;
   estimating respective sets of candidate bounding boxes for each frame of the set of training videos using the learned exemplar HOG-LDA templates, wherein each candidate bounding box has an associated template matching score;
   inferring respective discrete hidden states and a respective bounding box for each discrete hidden state for a plurality of localizer Hidden Markov Models (HMM) using the estimated sets of candidate bounding boxes, where each localizer HMM is associated with an action of the plurality of actions; and
   determining a respective set of parameters for each inferred discrete hidden state of the plurality of localizer HMMs using an objective function.

10. The non-transitory computer-readable medium of claim 9, wherein respective videos of the set of training videos comprise a plurality of frames respectively comprising a bounding box around area of the frame corresponding to the action to which the video is classified.

11. The non-transitory computer-readable medium of claim 10, wherein the objective function considers an overlap function comparing inferred bounding boxes for each frame of the set of training videos with corresponding bounding boxes included with each frame of the set of training videos.

12. The non-transitory computer-readable medium of claim 9, wherein the set of parameters comprises:
   a width penalty weight for an inferred bounding box for the discrete hidden state to deviate from an estimated mean width of bounding boxes associated with the discrete hidden state; and
   a height penalty weight for the inferred bounding box for the discrete hidden state to deviate from an estimated mean height of bounding boxes associated with the discrete hidden state;
   a temporal consistency cost for the inferred bounding box for the discrete hidden state to deviate from an previous inferred bounding box for a previous discrete hidden state immediately preceding the discrete hidden state in a sequence of discrete hidden states associated with a localizer HMM;
   a template consistency cost for the inferred bounding box for the discrete hidden state to deviate from a candidate bounding box for the discrete hidden state;
   a scale for calibrating template matching scores associated with the discrete hidden state across the set of actions; and
   an offset for calibrating template matching scores associated with the discrete hidden state across the set of actions.

13. The non-transitory computer-readable medium of claim 9, wherein the inferring the respective discrete hidden states and a respective bounding box for each discrete hidden state for the plurality of localizer Hidden Markov Models (HMM) comprises employing a Viterbi inference algorithm on the estimated sets of candidate bounding boxes.

14. The non-transitory computer-readable medium of claim 9, wherein the determining the respective set of parameters for each inferred discrete hidden state of the plurality of localizer HMMs comprises employing a gradient based approach on the objective function.

15. The non-transitory computer-readable medium of claim 14, wherein the employing a gradient based approach on the objective function comprises generating a random direction.

16. The non-transitory computer-readable medium of claim 9, wherein the objective function considers a soft-max of the cost of associated with a localizer HMM associated with an action against costs associated with other localizer HMMs associated with other actions.

17. A system comprising:
a processor; and
a memory communicatively coupled to the processor, the memory having stored therein computer-executable instructions, comprising:
  a HOG-LDA training component configured to:
    access a set of training videos respectively classified for an action of a plurality of actions; and
    learn a plurality of exemplar Histogram of Oriented Gradients Linear Discriminant Analysis (HOG-LDA) templates using a HOG-LDA model on the a set of training videos;
  a HOG-LDA scoring component configured to estimate respective sets of candidate bounding boxes for each frame of the set of training videos using the learned exemplar HOG-LDA templates, wherein each candidate bounding box has an associated template matching score;
  a Viterbi inference component configured to infer respective discrete hidden states and a respective bounding box for each discrete hidden state for a plurality of localizer Hidden Markov Models (HMM) using the estimated sets of candidate bounding boxes, where each localizer HMM is associated with an action of the plurality of actions; and
  an objective maximization component configured to determine a respective set of parameters for each inferred discrete hidden state of the plurality of localizer HMMs using an objective function.

18. The system of claim 17, wherein respective videos of the set of training videos comprise a plurality of frames respectively comprising a bounding box around area of the frame corresponding to the action to which the video is classified.

19. The system of claim 18, wherein the objective function considers an overlap function configured to compare inferred bounding boxes for each frame of the set of training videos with corresponding bounding boxes included with each frame of the set of training videos.

20. The system of claim 17, wherein the set of parameters comprises:
  a width penalty weight for an inferred bounding box for the discrete hidden state to deviate from an estimated mean width of bounding boxes associated with the discrete hidden state; and
  a height penalty weight for the inferred bounding box for the discrete hidden state to deviate from an estimated mean height of bounding boxes associated with the discrete hidden state;
  a temporal consistency cost for the inferred bounding box for the discrete hidden state to deviate from an previous inferred bounding box for a previous discrete hidden state immediately preceding the discrete hidden state in a sequence of discrete hidden states associated with a localizer HMM;
  a template consistency cost for the inferred bounding box for the discrete hidden state to deviate from a candidate bounding box for the discrete hidden state;
  a scale for calibrating template matching scores associated with the discrete hidden state across the set of actions; and
  an offset for calibrating template matching scores associated with the discrete hidden state across the set of actions.

21. The system of claim 17, wherein the Viterbi inference component is further configured to employ a Viterbi inference algorithm on the estimated sets of candidate bounding boxes to infer the respective discrete hidden states and the respective bounding box for each discrete hidden state for the plurality of localizer Hidden Markov Models (HMM).

22. The system of claim 17, wherein the objective maximization component is further configured to employ a gradient based approach on the objective function to determine the respective set of parameters for each inferred discrete hidden state of the plurality of localizer HMMs comprises.

23. The system of claim 22, wherein the gradient based approach uses a random direction.

24. The system of claim 17, wherein the objective function considers a soft-max of the cost of associated with a localizer HMM associated with an action against costs associated with other localizer HMMs associated with other actions.

* * * * *